(12) United States Patent
Creamer et al.

(10) Patent No.: US 7,751,535 B2
(45) Date of Patent: Jul. 6, 2010

(54) VOICE BROWSER IMPLEMENTED AS A DISTRIBUTABLE COMPONENT

(75) Inventors: Thomas E. Creamer, Boca Raton, FL (US); Victor S. Moore, Boynton Beach, FL (US); Wendi L. Nusbickel, Boca Raton, FL (US); Ricardo Dos Santos, Boca Raton, FL (US); James J. Sliwa, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 1216 days.

(21) Appl. No.: 10/833,522

(22) Filed: Apr. 28, 2004

(65) Prior Publication Data

US 2005/0246176 A1 Nov. 3, 2005

(51) Int. Cl.
*H04M 1/62* (2006.01)
*G10L 21/00* (2006.01)
*G10L 21/06* (2006.01)
*H04M 1/64* (2006.01)

(52) U.S. Cl. .............. 379/88.17; 704/270; 704/270.1; 704/275; 379/69; 379/88.04

(58) Field of Classification Search ............... 704/201, 704/231–232, 251, 270–275; 379/67.1–68, 379/88.01–88.18, 88.22–88.27
See application file for complete search history.

(56) References Cited

U.S. PATENT DOCUMENTS

| | | | |
|---|---|---|---|
| 6,351,776 B1 * | 2/2002 | O'Brien et al. ............. 709/245 |
| 6,401,134 B1 | 6/2002 | Razavi et al. |
| 6,421,727 B1 | 7/2002 | Reifer et al. |
| 7,020,697 B1 * | 3/2006 | Goodman et al. ............ 709/223 |
| 7,099,442 B2 * | 8/2006 | Da Palma et al. .......... 379/88.22 |
| 2001/0055370 A1 * | 12/2001 | Kommer ..................... 379/88.01 |
| 2002/0091837 A1 | 7/2002 | Baumeister et al. |
| 2002/0108099 A1 * | 8/2002 | Paclat ............................ 717/102 |
| 2002/0198719 A1 * | 12/2002 | Gergic et al. ............... 704/270.1 |
| 2003/0007609 A1 * | 1/2003 | Yuen et al. ................. 379/88.16 |
| 2003/0088421 A1 * | 5/2003 | Maes et al. ................ 704/270.1 |
| 2003/0120502 A1 * | 6/2003 | Robb et al. ...................... 705/1 |
| 2004/0006476 A1 * | 1/2004 | Chiu ........................... 704/270.1 |
| 2004/0028212 A1 * | 2/2004 | Lok et al. ................ 379/265.09 |
| 2004/0120473 A1 * | 6/2004 | Birch et al. ................ 379/88.17 |
| 2005/0091057 A1 * | 4/2005 | Phillips et al. ............. 704/270.1 |
| 2005/0201532 A1 * | 9/2005 | Chang ....................... 379/88.17 |
| 2005/0246714 A1 * | 11/2005 | Moore et al. ................. 719/315 |
| 2007/0136436 A1 * | 6/2007 | Palma et al. ................. 709/217 |

OTHER PUBLICATIONS

Boone, Kevin. Applied Enterprise JavaBeans Technology. "The EJB container and its proxies," Chapter 3, section 8. 2003: Sun Microsystems, Inc. Accessed via <http://proquest.safaribooksonline.com/>.*

* cited by examiner

*Primary Examiner*—Talivaldis I Smits
*Assistant Examiner*—David Kovacek
(74) *Attorney, Agent, or Firm*—Wolf, Greenfield & Sacks, P.C.

(57) ABSTRACT

A system for implementing voice services can include at least one virtual machine, such as a Java 2 Enterprise Edition (J2EE) virtual machine. The virtual machine can include a bean container for handling software beans, such as Enterprise Java Beans. The bean container can include a voice browser bean. The voice browser bean can include a VoiceXML browser.

20 Claims, 1 Drawing Sheet

VOICE BROWSER IMPLEMENTED AS A DISTRIBUTABLE COMPONENT

BACKGROUND

1. Field of the Invention

The present invention relates to the field of computer software and, more particularly, to voice browsers.

2. Description of the Related Art

Voice browsers are designed to standardize a user interface for customers browsing voice-driven content and services on a Voice Web. As such, a voice browser can be a device that interprets voice markup languages to create audio dialogues for synthesizing speech, digitizing audio, recognizing voice output, and interpreting voice input. One such voice markup language includes the Voice eXtensible Markup Language (VoiceXML) that is a markup language based on the World Wide Web Consortium's (W3C) industry-standard eXtensible Markup Language (XML).

Voice browsers can permit users to access an Internet or other packetized network using a telephone, where the telephone can be an interface peripheral used in a fashion analogous to the usage of a keyboard, mouse, and display for a "traditional" Web browser. In contrast to a traditional Web browser, which often resides as a client on; a user's computing device, a voice browser typically resides within a centralized server. The centralized server can receive audio input from a client for processing by the voice browser. The voice browser can responsively produce audio output, which can be conveyed from the centralized server to the client.

Current voice browser implementations are designed to be platform agnostic. That is, in order for a voice browser to run on a specific platform, one or more services or pieces of code are needed to tie the browser to the platform. The voice browser uses these services to communicate to platform specific resources, such as telephony resources, audio resources, and/or speech engines.

Voice browsers can be part of scalable voice solutions that include middleware components. The middleware components are predominately written in conformance with the JAVA 2 ENTERPRISE EDITION® (J2EE) standard, which supports multi-tiered, platform independent, distributed applications. One such middleware solution is a WebSphere Application Server® (WAS) from International Business Machines Corporation (IBM) of Armonk, N.Y. In order to easily scale a voice server solution, voice server components should be distributable among several machines. The degree of complexity required to distribute these components, however, can be extremely high due to the need for mechanisms to distribute and manage resources, prioritize tasks, route requests, and the like.

Conventional voice browsers are typically written as stand-alone solutions that require software programmers to develop and maintain the complex routines for managing distributed software segments and prioritizing and processing tasks received from multiple requesting clients. There are many reasons artisans skilled in software design choose stand-alone implementations instead of implementing the voice browser as a middleware component.

For components of a middleware solution to interoperate, each component must typically reside within a single program space that can be within a virtual machine. Alternatively, an external interface routine is necessary. External interface usage can add inefficiencies that result in latencies, which can be unacceptable when performing real-time processing tasks. Voice browsers often perform such real-time tasks. Additionally, voice browsers can utilize browser services and speech engines, each of which resides outside the program space of the voice browser. Accordingly, implementing a voice browser in a fashion which avoids long latencies can be extremely challenging; so much so, that no known methodology successfully implements a voice browser as a deployable software component written for a platform independent architecture.

It would be highly beneficial, however, if a voice browser could be successfully integrated within a middleware solution, such as a solution adhering to the J2EE architecture. Using the J2EE infrastructure can permit the leveraging of security routines, task management, signal routing, and other management tools, thereby reducing software overhead of the voice browser without sacrificing functionality.

SUMMARY OF THE INVENTION

The present invention provides a method, a system, and an apparatus for implementing a voice browser as a distributable component in accordance with the inventive arrangements disclosed herein. More specifically, a voice browser can be written as an Enterprise Java Bean® (EJB) so that the voice browser can be integrated within a middleware solution, such as the WebSphere Application Server (WAS). The voice browser EJB can include a telephone service module, an audio service module, an automatic speech recognition (ASR) service module, a text-to-speech (TTS) service module, and the like. Each module can interface with remote software components that provide one or more services for the voice browser EJB. Implementing a voice browser as an EJB can permit a voice browser to take advantage of the WAS infrastructure as well as other J2EE infrastructures. Further, the solution expressed herein does not require components utilized by the voice browser to be running in the same program space as the voice browser bean, thereby serializing the capabilities of the voice browser.

One aspect of the present invention can include a system for implementing voice services. The system can include at least one virtual machine. The virtual machine can include a bean container for handling software beans. The bean container can include a voice browser bean.

Another aspect of the present invention can include a telephony system. The telephony system can include a J2EE middleware component providing at least one telephony service. The middleware component can include a virtual machine containing at least one deployable software object written for a platform-independent component architecture. The software object can include a voice browser. The voice browser can access at least one service from a remotely located software component disposed outside the virtual machine.

Yet another aspect of the present invention can include a voice browser that is implemented as a deployable software object written for a platform-independent component architecture. The voice browser can include a telephone service module, an audio service module, an ASR service module, and a TTS service module. Each module can interface with an associated component that is remotely located from the voice browser.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
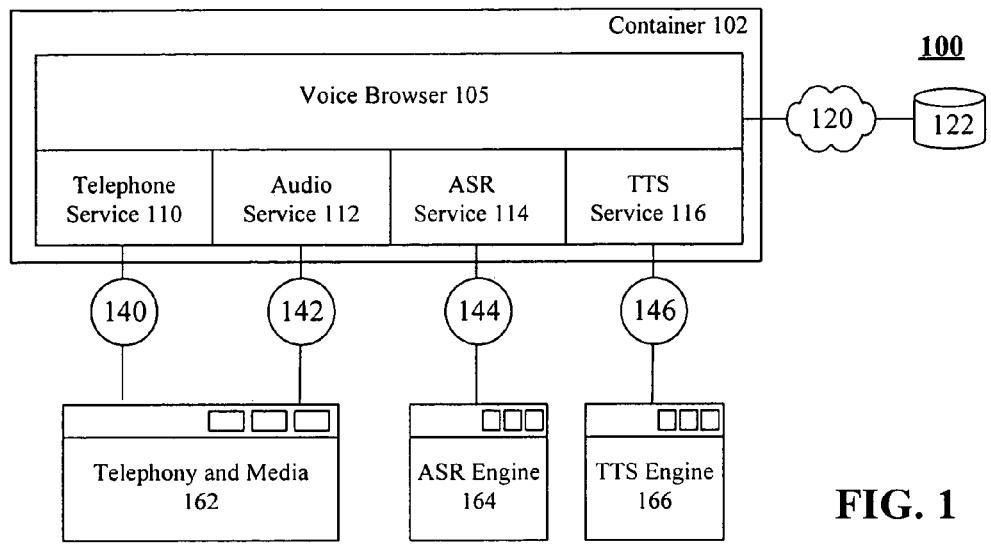
FIG. 1 is a schematic diagram illustrating a system for implementing a componentized voice browser in accordance with the inventive arrangements disclosed herein.

FIG. 1 is a schematic diagram illustrating a system 100 for implementing a componentized voice browser in accordance with the inventive arrangements disclosed herein. The system 100 can include a telephone and media component 162, an automatic speech recognition (ASR) engine 164, a text-to-speech (TTS) engine 166, and a voice browser 105.

The telephone and media component 162 can be a media serving component that facilitates internal and/or external communications. The media component 162 can interface a telephone gateway with a middleware solution, which provides at least one telephony service. Different components within the middleware solution can utilize the telephony and media component 162 to communicate with each other. For example, the voice browser 105 and a telephone server can be two components of a middleware telephony solution, which exchange communications through the telephony and media 162 component. It should be appreciated that other embodiments can permit components of the middleware solution to communicate directly with one another, not needing to use the telephony and media 162 component as a communication intermediary.

The ASR engine 164 can be a speech engine that provides at least one ASR service for the voice browser 105. Similarly, the TTS engine 166 can be a speech engine that provides at least one TTS service for the voice browser 105.

The voice browser 105 can be a device that interprets voice markup languages to generate voice output and interpret voice input. One such voice markup language interpreted by the voice browser 105 can include VoiceXML. The voice browser 105 can be implemented as a deployable software object written to operate within a container 102 included within a platform-independent component architecture.

The container 102 can be disposed within a virtual machine, such as a virtual machine of a middleware telephony solution. One such middleware solution can include a WebSphere Application Server (WAS). In one embodiment, the software object in which the voice browser 105 is implemented can be an EJB. In another embodiment, the platform-independent component architecture within which the software object is deployable can conform to the J2EE specification.

The voice browser 105 can include a telephone service module 110, an audio service module 112, an ASR service module 114 and/or a TTS service module 116. The telephone service module 110 can interface with a remote component that controls the setup, monitoring, and tear down of phone calls.

In one embodiment, the telephone service module 110 can interface with a call control servlet 140 disposed in the remote component. For example, the call control servlet 140 can be implemented within a telephone server. In one embodiment, the call control servlet 140 can interface with a call control component through the telephony and media component 162. In such an embodiment, HyperText Transfer Protocol (HTTP) messages can be conveyed between the telephone service module 110 and the call control servlet 140. The call control servlet 140 can execute suitable programmatic actions responsive to receiving the requests.

The audio service module 112 can include an interface for conveying audio information between the voice browser 105 and remotely located software components. In one embodiment, an audio interface object 142 can be used as a communication intermediary between the voice browser 105 and a telephone and media component 162, such as a media converter. The audio interface object 142 can include an EJB, which can be disposed within a separate and distinct virtual machine. That is, a virtual machine remotely located from the virtual machine in which the voice browser 105 resides.

Several standardized protocols, such as transmission control protocol/Internet Protocol (TCP/IP), User Datagram Protocol (UDP), remote method invocation (RMI), and Internet Inter-ORB protocol (IIOP), can be used to convey data between the audio service module 112 and the audio interface object 142. The invention is not limited in this regard, however, and other standardized protocols can be used to convey media information between the audio interface object 142 and the telephony and media component 162.

The ASR service module 114 can include an interface between the voice browser 105 and the ASR engine 164. In one embodiment, an ASR object 144 can be used as a communication intermediary between the voice browser 105 and the ASR engine 164. For example, the ASR object 144 can include an EJB, which can be disposed within a virtual machine remotely located from the virtual machine in which the voice browser 105 resides. Several standardized protocols, such as RMI and IIOP, can be used to convey data between the ASR service module 114 and the ASR object 144.

The TTS service module 116 can include an interface between the voice browser 105 and the TTS engine 166. In one embodiment, a TTS object 146 can be used as a communication intermediary between the voice browser 105 and the TTS engine 166. Like the ASR object 144, the TTS object 146 can include an EJB, which can be disposed within a virtual machine remotely located from the virtual machine in which the voice browser 105 resides. Additionally, several standardized protocols, such as RMI and IIOP, can be used to convey data between the TTS service module 116 and the TTS object 146.

The voice browser 105 can also utilize a voice browser cache 122 to improve execution efficiency. Communications between the voice browser 105 and the voice browser cache 122 can occur through a network 120. In one embodiment, the voice browser cache 122 can cache dynamic content. For example, the voice browser cache 122 can include a WAS dynacache.

Figure 2:
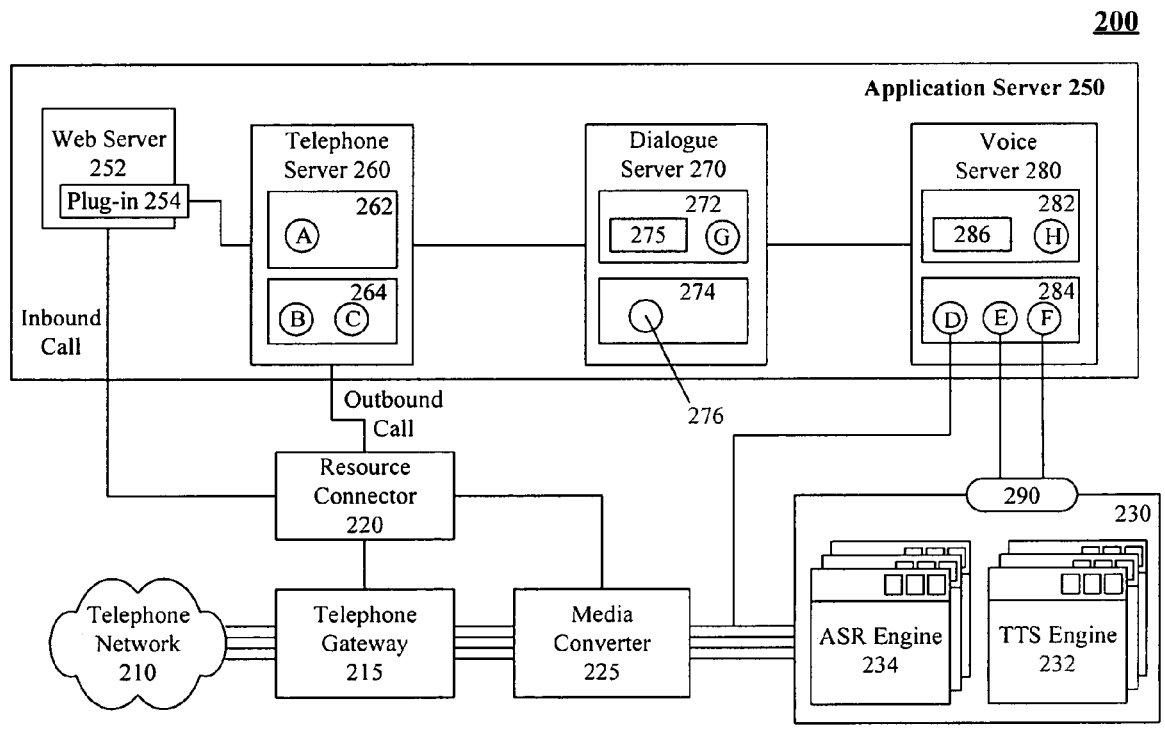
FIG. 2 is a schematic diagram illustrating a middleware architecture for a voice browser middleware component in accordance with the inventive arrangements disclosed herein.

FIG. 2 is a schematic diagram illustrating a middleware architecture 200 for a voice browser middleware component in accordance with the inventive arrangements disclosed herein. The architecture 200 can include a telephone gateway 215, one or more speech engines, 230, and a telephony application server 250.

The telephone gateway 215 can include hardware and/or software that translates protocols and/or routes calls between a telephone network 210, such as a Public Switched Telephone Network (PSTN), and the application server 250. The telephone gateway 215 can route calls using packet-switched as well as circuit switched technologies. Further, the telephone gateway 215 can contain format converting components, data verification components, and the like. For example, the telephone gateway 215 can include a CISCO 2600 series router from Cisco Systems, Inc. of San Jose, Calif., a Cisco, a CISCO 5300 series gateway, a Digital Trunk eXtended Adapter (DTXA), an INTEL DIALOGIC® Adaptor from Intel Corporation of Santa Clara, Calif., and the like.

The speech engines 230 can include one or more automatic speech recognition engines 234, one or more text to speech engines 232, and other media resources. Particular ones of the speech engines 230 can include one or more application program interfaces (APIs) for facilitating communications between the speech engine 230 and external components. For example, in one embodiment, the ASR engine 234 can include an IBM ASR engine with an API such as SMAPI. Selective ones of the speech engines 230 can include a control interface 290 for interfacing with the application server 250.

The application server 250 can include an engine that functions as a reliable foundation for handling high volume secure transactions and Web services. In one embodiment, the application server 250 can be a WAS.

The application server 250 can also include a multitude of component servers, such as telephone server 260, dialogue server 270, and voice server 280, communicatively linked via one or more Web servers 252. Each Web server 252 can include one or more plug-ins 254, where each plug-in 254 can include routines for conveying data to particular component servers within the application server 250. Each of the component servers of the application server 250 can be components implemented within a Virtual Machine, such as virtual machines adhering to the J2EE specification or other similar and/or derivative specification.

The telephone server 260 can control the setup, monitoring, and tear down of phone calls. In one arrangement, telephone server 260 can include a web container 262 and an EJB container 264. Moreover, the telephone server 260 can include a call control servlet (Servlet A), a call control EJB (Bean B), and a call control interpreter EJB (Bean C).

The dialogue server 270 can manage tasks relating to call dialogue for the application server 250. The dialogue server 270 can include a voice browser 276, such as the voice browser 105 illustrated in FIG. 1. The voice browser 276 can be implemented as an EJB. In one arrangement, the dialogue server 270 can include Web container 272 and EJB container 274. The web container 272 can include a voice browser cache 275.

The voice server 280 can handle one or more speech services for the application server 250. In one arrangement, the voice server 280 can include Web container 282 and EJB container 284. The Web container 282 can include a voice browser cache 286.

Moreover, the voice server 280 can include a multitude of interface beans. For example, Bean D can be an audio interface bean for communicating between the media converter 225 and the voice browser 276. Additionally, each different type of speech engine 230 can be associated with an interface bean. For example, an ASR interface bean (Bean E) can communicate with the ASR Engine 235. In another example, a text-to-speech interface bean (Bean F) can interface with TTS engine 232.

It should be appreciated that the telephone server 260, the dialogue server 270, and the voice server 280 can be arranged in a multitude of fashions and that the invention is not to be limited to the illustrative arrangement presented herein.

The system 200 can also include a media converter 225 and a resource connector 220. The media converter 225 can be a communication intermediary for streaming speech data configured to resolve protocol issues between the telephone gateway 215 and speech engines 230. Audio data can be streamed bi-directionally between the telephone gateway 215 and the speech engines 230 as appropriate.

The resource connector 220 can be a communication intermediary between the telephone gateway 215 and the application server 250 and/or media converter 225 that allocates resources for calls. In one embodiment, the resource connector 220 can normalize a telephony request into a request that is acceptable by the application server 250, thereby providing a generic means for the telephone gateway 215 to interface with the application server 250. For example, if the application server 250 communicates using HTTP messages, the resource connector 220 can convert a telephony request into an appropriate HTTP message. In another example, if the application server 250 utilizes a Session Initiation Protocol (SIP), the resource connector 220 can convert a telephony request into an appropriate SIP message.

In operation, a user can initiate a telephone call. The call can be conveyed through a telephone network 210 and can be received by the telephone gateway 215. The telephone gateway 215 can convey call information to the resource connector 220. The resource connector 220 can initialize the media converter 225, which can establish one or more media ports that can be used for the call. Identifiers, which can be Uniform Resource Identifiers (URI), associated with the reserved media ports can be conveyed to the resource connector 220. The resource connector 220 can convey call identifying information and media port identification information to the application server 250.

Once a call has been established, functions of the voice browser 276 can be triggered as appropriate. For example, telephony control data can be exchanged between the voice browser 276 and call control Servlet A, as needed. In another example, audio signals can be conveyed between the voice browser 276 and the media converter 225 via audio interface Bean D. In yet another example, the voice browser 276 can convey requests to the ASR engine 234 via the ASR interface Bean E. In still another example, the voice browser 276 can convey requests to the TTS engine 232 via the TTS interface Bean F. After receiving the request, the ASR engine 234 and/or the TTS engine 232 can process the request and can convey a request result back to the voice browser 276, as needed.

It should be appreciated, that FIG. 2 is just one illustrative embodiment in which the voice browser 276 can be implemented as a deployable component. The subject matter disclosed herein can be utilized in conjunction with any system where a voice browser is implemented as a deployable software object written for a platform-independent component architecture, such as a J2EE architecture. Accordingly, the example of FIG. 2 should not be construed as a limitation of the present invention.

Moreover, a number of components can be utilized that have not been explicitly shown in FIG. 2. For example, the telephone server 260, the dialogue server 270, and/or the speech server 280 can include a Java Connector Architecture (JCA) container (not shown). The JCA container can provide a well defined interface for components local to the application server 205. In one embodiment, the JCA container can function as an interface between beans within the EJB container 284 and components internal to the application server 205.

Additionally, the functionality attributable to the components of system 200 can be combined or separated in different manners than those illustrated herein. The components shown herein can also reside within different computing spaces than those illustrated. For example, the media converter 225, if written in Java, can reside within the application server. 250. In such an example, a specific location in which to dispose the media converter 225 can be within a JCA container (not shown) of the voice server 280.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction; in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system comprising at least one processor programmed to implement:
    a middleware component comprising at least one virtual machine;
    a bean container for handling software beans configured to operate within the at least one virtual machine; and
    a deployable software object written for a platform independent architecture, the deployable software object comprising a voice browser bean configured to operate within the bean container.

2. The system of claim 1, said at least one virtual machine comprising:
    a dialogue server configured to manage telephony call dialogue, the dialogue server containing the bean container.

3. The system of claim 1, said at least one virtual machine comprising a first virtual machine and a second virtual machine different from the first virtual machine, the first virtual machine comprising a telephone server configured to control setup, monitoring, and tear down of phone calls, wherein the bean container is disposed in the second virtual machine, and wherein the voice browser bean utilizes capabilities of the telephone server.

4. The system of claim 1, said at least one virtual machine comprising:
    a speech server configured to provide one or more speech services, wherein the speech server is located within one of the virtual machines other than the virtual machine in which the bean container is disposed, and wherein the voice browser bean utilizes capabilities of the speech server.

5. The system of claim 4, said speech server comprising a bean container that comprises at least one interface bean, each interface bean interfacing with a remotely located speech engine.

6. The system of claim 1, said voice browser bean comprising:
    a telephone service module configured as an interface between the voice browser bean and at least one telephony system.

7. The system of claim 1, said voice browser bean comprising:
    an audio service module configured as an interface conveying audio signals between the voice browser bean and remotely located software components.

8. The system of claim 1, said voice browser bean comprising:
    an automatic speech recognition (ASR) service module configured as an interface between the voice browser bean and a component providing at least one ASR service.

9. The system of claim 1, said voice browser bean comprising:
    a text-to-speech (TTS) service module configured as an interface between the voice browser bean and a component providing at least one TTS service.

10. The system of claim 1, further comprising:
    a voice browser cache remotely located from the bean container that is configured as a cache for the voice browser bean.

11. The system of claim 10, wherein said voice browser cache caches dynamic content.

12. The system of claim 1, said at least one virtual machine being a Java 2 Enterprise Edition (J2EE) type virtual machine.

13. The system of claim 1, wherein said voice browser bean comprises an Enterprise Java Bean (EJB).

14. The system of claim 1, said voice browser bean comprising a VoiceXML browser.

15. A computer-readable storage medium having encoded thereon computer instructions that, when executed, implement a voice browser comprising:
    a telephone service module configured as an interface to at least one telephony system;
    an audio service module configured as an interface to at least one remotely located software component;
    an automatic speech recognition (ASR) service module configured as an interface to at least one component providing at least one ASR service; and
    a text-to-speech (TTS) service module configured as an interface to a component providing at least one TTS service,
    wherein the voice browser is implemented as a deployable software object written for a platform-independent component architecture and is configured to operate within a container that is disposed within a middleware component, and wherein at least one of the telephone service module, the audio service module, the ASR service module and the TTS service module is further configured to communicate via an interface object comprising a java bean.

16. The computer-readable medium of claim 15, wherein said software object is an Enterprise Java Bean (EJB).

17. The computer-readable medium of claim 15, wherein the voice browser is configured to:
    access a voice server cache, said cache disposed in a location external to the voice browser.

18. A telephony system comprising:
    at least one computer-readable medium and at least one processor, the at least one computer-readable medium having encoded thereon computer instructions that, when executed by the at least one processor, implement a Java 2 Enterprise Edition (J2EE) middleware component providing at least one telephony service, said middleware component comprising a virtual machine, said virtual machine including at least one deployable software object written for a platform-independent component architecture, wherein said software object includes a voice browser, said middleware component further comprising at least one interface bean for communicating between the voice browser and at least one software component disposed outside the virtual machine.

19. The telephony system of claim 18, wherein said voice browser includes a speech service module for communication with an interface bean disposed outside the virtual machine, said interface bean interfacing with a remote speech engine that provides at least one service for the voice browser.

20. The telephony system of claim 18, wherein said middleware component is a WebSphere Application Server (WAS).

* * * * *